United States Patent [19]
Wu

[11] Patent Number: 5,902,097
[45] Date of Patent: May 11, 1999

[54] PUMPING DEVICE WITH A CLAMPING NOZZLE FOR VARIOUS VALVES

[76] Inventor: Scott Wu, No. 2, Lane 296, Ming Sheng Road, Wu Feng Hsiang, Taichung Hsien, Taiwan

[21] Appl. No.: 08/861,314

[22] Filed: May 19, 1997

[51] Int. Cl.[6] ................................................ F04B 41/02
[52] U.S. Cl. .......................................... 417/440; 137/231
[58] Field of Search ................................ 7/138; 417/467, 417/440; 137/233, 231; 152/415; 141/38; 222/5

[56] References Cited

U.S. PATENT DOCUMENTS

| | | | |
|---|---|---|---|
| 1,301,508 | 4/1919 | Schroder | 137/231 |
| 2,939,478 | 6/1960 | Dockrell | 137/233 |
| 4,153,096 | 5/1979 | Kirk | 152/415 |
| 4,489,855 | 12/1984 | Boetger | 222/5 |
| 5,316,055 | 5/1994 | Brimmer | 141/38 |
| 5,715,554 | 2/1998 | Downs et al. | 7/138 |
| 5,779,457 | 7/1998 | Chuang et al. | 417/467 |
| 5,785,076 | 7/1998 | You | 137/231 |

*Primary Examiner*—Charles G. Freay
*Assistant Examiner*—Robert Z. Evora
*Attorney, Agent, or Firm*—Charles E. Baxley, Esq.

[57] ABSTRACT

A pumping device includes a tubular member and a piston reciprocatingly received in the tubular member, the piston together with the tubular member defining a chamber. A head is securely, sealingly mounted to an end of the tubular member. The head includes a compartment defined therein and in fluid communication with the chamber of the tubular member. An elastic nozzle is securely mounted in the compartment and includes a through hole for receiving a valve of a bicycle tire. The elastic nozzle further includes a recessed clamping section defined in an inner periphery thereof for securely clamping the valve during reciprocating motion of the piston in the tubular member.

4 Claims, 6 Drawing Sheets

PUMPING DEVICE WITH A CLAMPING NOZZLE FOR VARIOUS VALVES

BACKGROUND OF THE INVENTION

1. Field of the Invention

The present invention relates to a pumping device with a clamping nozzle for securely clamping valves of different sizes.

2. Description of the Related Art

Various pumping devices have heretofore been provided for inflating bicycle tires. Since there are many kinds of valves for bicycle tires, e.g., French valve, Japanese valve, and American valve, a so-called "double head" type pump with a switch means has been proposed to be used on these different valves. In addition, clamping devices have been proposed to securely clamp the valves during inflation of the tire. Nevertheless, it still requires manual operation to operate the switch means and the clamping devices.

The present invention is intended to provide a pumping device which may automatically clamp valves of different sizes during inflation.

SUMMARY OF THE INVENTION

In accordance with one aspect of the invention, a pumping device for a valve of a bicycle tire comprises a tubular member and a piston reciprocatingly received in the tubular member, the piston together with the tubular member defining a chamber. A head is securely, sealingly mounted to an end of the tubular member. The head includes a compartment defined therein and in fluid communication with the chamber of the tubular member.

An elastic nozzle is securely mounted in the compartment. The elastic nozzle includes a through hole for receiving the valve of the bicycle tire. The elastic nozzle further includes a recessed clamping section defined in an inner periphery thereof for securely clamping the valve during reciprocating motion of the piston in the tubular member. The pumping means further includes means for supplying air into the chamber during reciprocating motion of the piston.

In accordance with another aspect of the invention, a pumping device for a valve of a bicycle tire comprises a tubular member and a piston reciprocatingly received in the tubular member, the piston together with the tubular member defining a chamber. A head is securely, sealingly mounted to the end of the tubular member. The head includes a first compartment defined in a first end thereof and a second compartment defined in a second end thereof, in which the second compartment intercommunicates the first compartment with the chamber of the tubular member. A check valve is mounted in the tubular member such that air is only flowable from the chamber of the tubular member to the second compartment.

An elastic nozzle is securely mounted in the first compartment. The elastic nozzle includes a through hole for receiving the valve of the bicycle tire. The elastic nozzle further includes a recessed clamping section defined in an inner periphery thereof for securely clamping the valve during reciprocating motion of the piston in the tubular member.

A cap is mounted to the first end of the head to securely position the elastic nozzle in the first compartment. The cap includes a hole through which the valve of the bicycle tire is extended into the through hole of the elastic nozzle for inflation. The pumping device further includes means for supplying air into the chamber during reciprocating motion of the piston.

The pumping device may further include a needle mounted in the head. The needle includes an end extending into the through hole of the elastic nozzle for engaging with the valve of the bicycle tire.

The pumping device may further comprise a pressure release valve mounted to the second compartment for releasing pressure in the second compartment for removal of the valve after inflation is accomplished.

In accordance with a further aspect of the invention, a pumping device for a valve of a bicycle tire comprises a tubular member and a piston reciprocatingly received in the tubular member, the piston together with the tubular member defining a chamber. A head is securely, sealingly mounted to an end of the tubular member. The head includes a first compartment defined in a first end thereof and a second compartment defined in a second end thereof, in which the second compartment intercommunicates the first compartment with the chamber of the tubular member. A first check valve is mounted in the tubular member such that air is flowable only from the chamber to the head. The head further includes a first passage defined therein and intercommunicating the second compartment with the first check valve. The head further includes a second passage defined therein and intercommunicating the first compartment with the first check valve. A second check valve is mounted in the second passage such that air is only flowable from the second passage to the first compartment.

An elastic nozzle is securely mounted in the first compartment. The elastic nozzle includes a through hole for receiving the valve of the bicycle tire. The elastic nozzle further includes a recessed clamping section defined in an inner periphery thereof for securely clamping the valve during reciprocating motion of the piston in the tubular member.

A cap is mounted to the first end of the head to securely position the elastic nozzle in the first compartment. The cap includes a hole through which the valve of the bicycle tire is extended into the through hole of the elastic nozzle for inflation. A pressing means is mounted in the first compartment. The pressing means includes a needle extending from a first end thereof toward the elastic nozzle for engaging with the valve of the bicycle tire. The pumping device further includes means mounted in the second compartment for biasing the needle of the pressing means toward the elastic nozzle. The pumping device further includes means for supplying air into the chamber during reciprocating motion of the piston.

Preferably, a pressure release valve is mounted to the second compartment for releasing pressure in the second compartment for removal of the valve after inflation is accomplished.

Other objects, advantages, and novel features of the invention will become more apparent from the following detailed description when taken in conjunction with the accompanying drawings.

DESCRIPTION OF THE PREFERRED EMBODIMENTS

Figure 1:
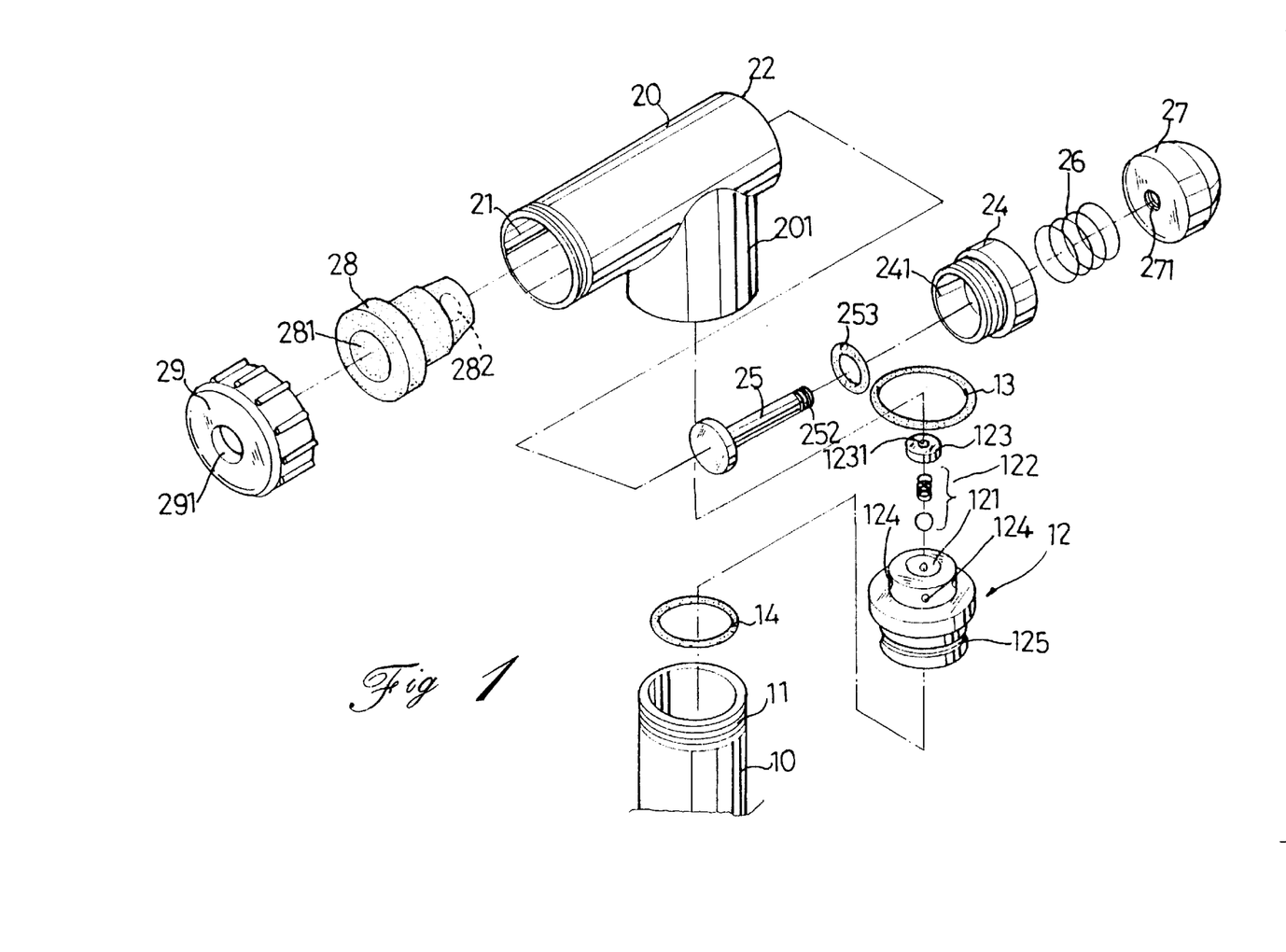
FIG. 1 is an exploded perspective view of a pumping device in accordance with the present invention.
Figure 2:
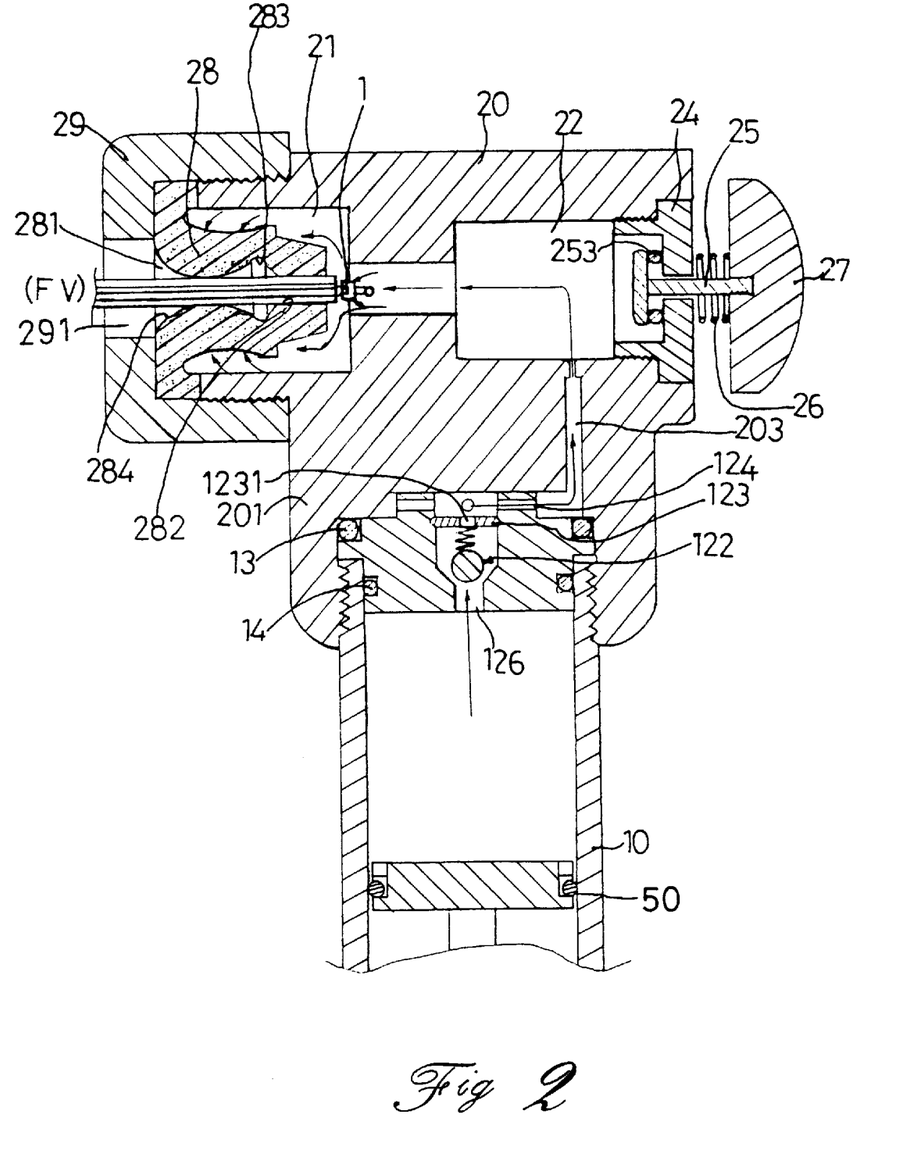
FIG. 2 is a cross sectional view illustrating operation of the pumping device on a French valve.
Figure 3:
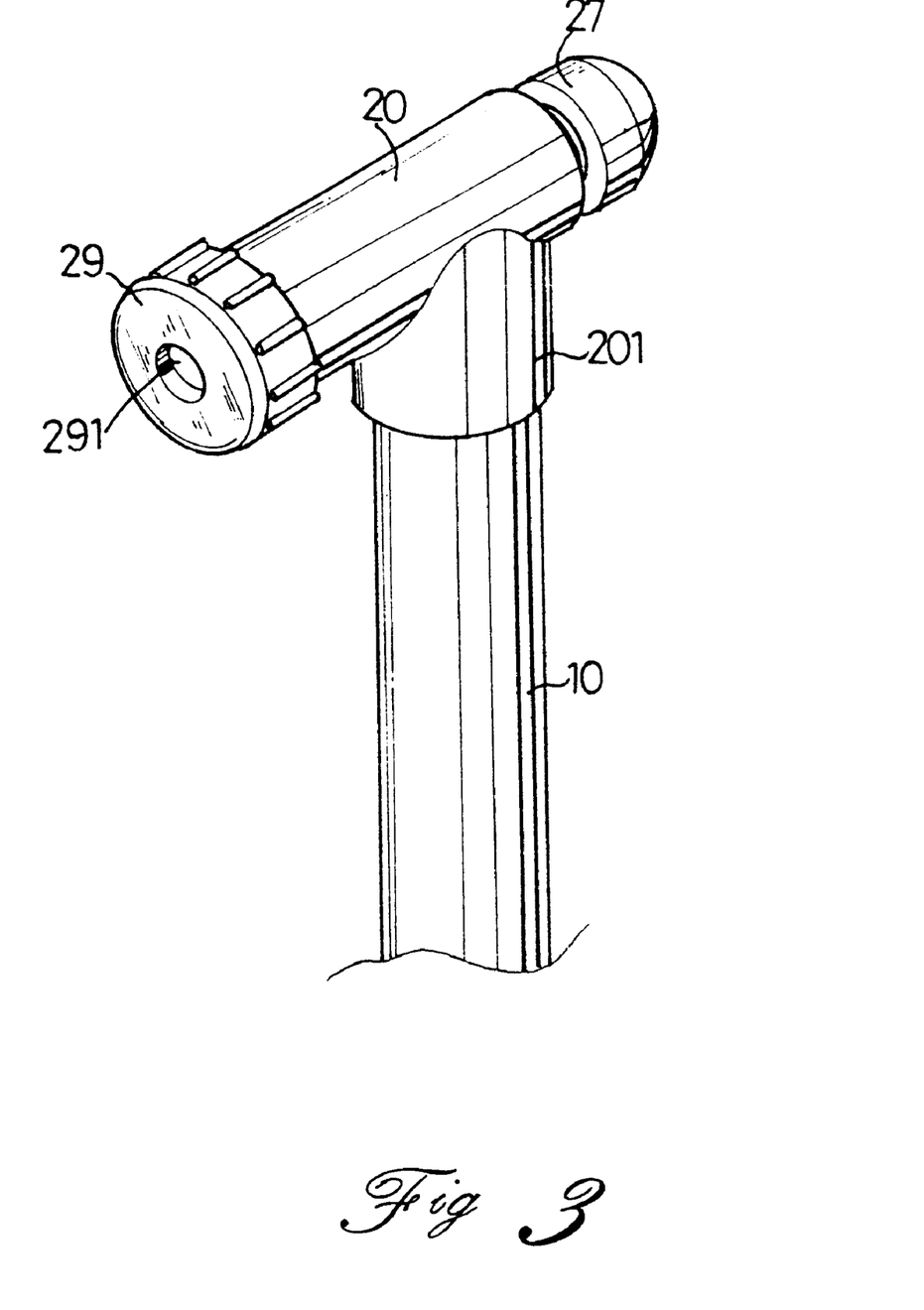
FIG. 3 is a perspective view of the pumping device.

Referring to the drawings and initially to FIGS. 1 to 3, a pumping device for bicycle tires in accordance with the present invention generally includes a tubular member 10 having a piston 50 reciprocatingly received therein. The tubular member 10 includes a passage 126 defined in an upper end thereof. A head 20 includes a lower portion 201 threadedly connected to an outer threading 11 formed on the upper end of the tubular member 10. The head 20 further includes a first compartment 21 defined in a first side thereof and a second compartment 22 defined in a second side thereof. The first compartment 21 is in fluid communication with the second compartment 22 which, in turn, is in fluid communication with the passage 126 of the tubular member 10 via a passage 203 defined therein. An O-ring 13 is mounted between the tubular member 10 and the lower portion 201, and another O-ring 14 is mounted to an inner periphery of the tubular member 10 to provide an air tight seal.

A check valve is mounted in the passage 126 so that air is only flowable from an interior of the tubular member 10 to the second compartment 22. In this embodiment, the check valve includes a spring-biased ball 122 and a plate 123 having an aperture 1231 defined therein, the operation of which will be described later.

A nozzle 28 of elastic material is mounted in the first compartment 21 and includes a through hole 282 defined therein. The nozzle 28 further includes a recessed clamping section 283 defined in a mediate portion of an inner periphery thereof. A cap 29 is mounted to the first side of the head 20 to securely position the nozzle 28 in the first compartment 21. The cap 29 includes a hole 291 in communication with the through hole 282 of the nozzle 28.

A second cap 24 is mounted to the second compartment 22. A stem 25 is extend through the second cap and securely attached to a pressure release button 27. The stem 25 includes a threaded end 252 (FIG. 1) in threading connection with a screw hole 271 defined in the button 27. A spring 26 is mounted around the stem 25 and between the button 27 and the second cap 24. An O-ring 253 is mounted to an enlarged head of the stem 25 to provide an air tight seal. By such an arrangement, when the button 27 is pressed, the pressure in the second compartment 22 may be released for removal of a valve of a bicycle tire.

In use, referring to FIG. 2, when pumping a tire (not shown) via a French valve (FV), the elastic nozzle 28 allows the French valve to extend therethrough to the first compartment 21 via an insert end 281 thereof. The nozzle 28 includes an arcuate section 284 in the insert end 281 to assist in insertion of the French valve. Upon reciprocating motion of the piston 50 in the tubular member 10, air inside the tubular member 10 is pumped to the first compartment 21 via the aperture 1231, an orifice 124, the passage 203, and the second compartment 22. Then, a portion of the air entering the first compartment 21 enters the French valve to achieve the inflation purpose, and the remaining portion of the air exerts a force on an outer side of the elastic nozzle 28 and thus urge the nozzle 28 to securely clamp the French valve. It is appreciated that the recessed section 283 assists in the clamping. It is further appreciated that, during pumping, environmental air enters a chamber defined by the tubular member 10 and a piston head of the piston 50 via a gap defined between the tubular member 10 and the piston head. More specifically, an O-ring (not labeled) mounted in the piston head allows air to be only flowable from the environment to the chamber, which is conventional and therefore not further described.

Figures 4, 4A, 4B:
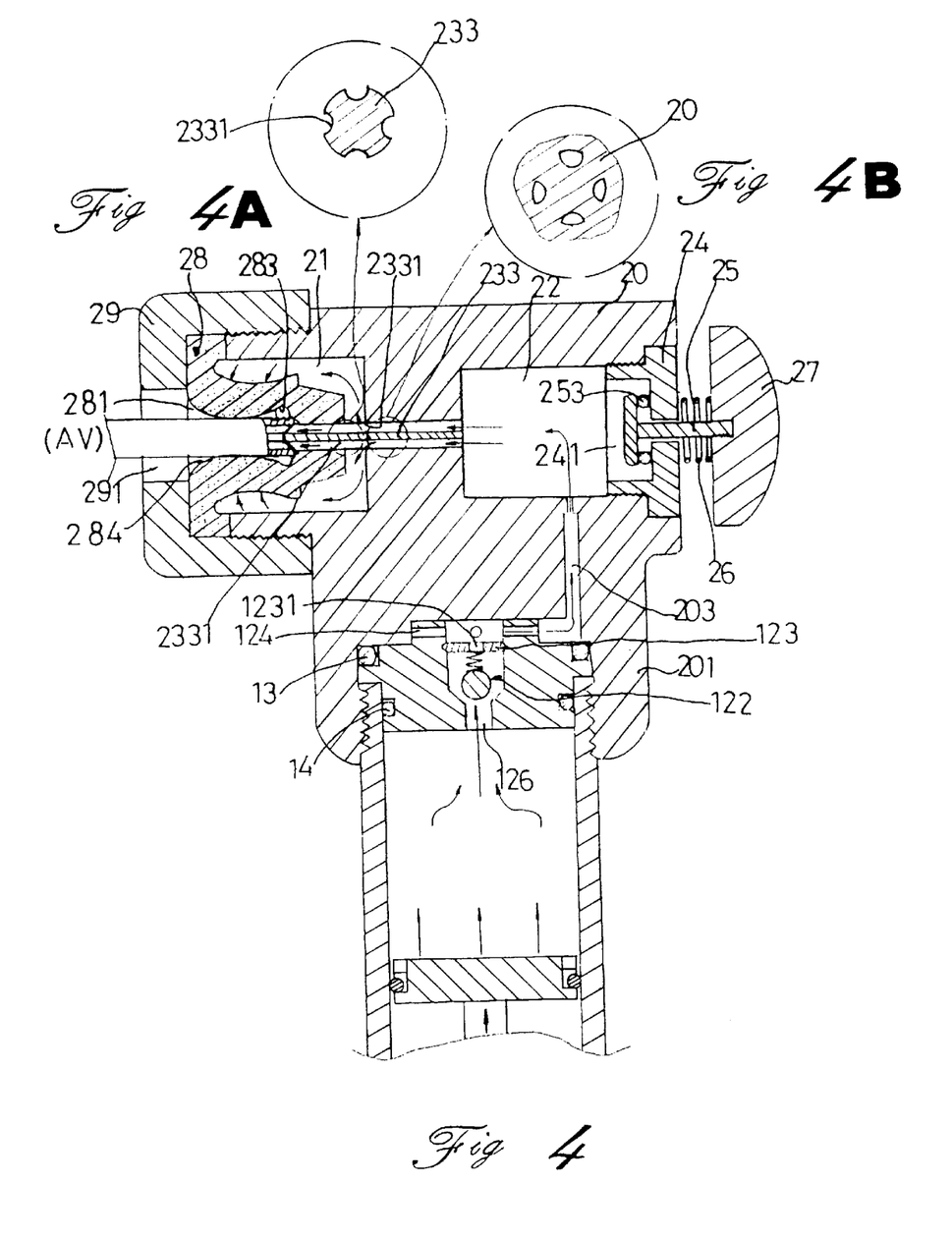
FIG. 4 is a cross sectional view illustrating operation of the pumping device on an American valve.
FIGS. 4A and 4B are enlarged views of two circles in FIG. 4, respectively.

Referring to FIG. 4, when used on an American valve (AV), since the American valve is shorter than the French valve, and an outer diameter of the American valve is greater than that of the French valve, an additional needle 233 is securely mounted in the head 20 (see FIG. 4B) with an end thereof extending into the through hole 282 of the nozzle 28 to engage with the American valve. As shown in FIG. 4A, the needle 233 includes a plurality of longitudinal recesses 2331 defined in an outer periphery thereof through which air may pass to the American valve.

In use, the elastic nozzle 28 allows the American valve to extend therethrough to the first compartment 21 via the insert end 281 thereof while the needle 233 engages with the American valve. Upon reciprocating motion of the piston 30 in the tubular member 10, air inside the tubular member 10 is pumped to the first compartment 21 via the aperture 1231, the passage 203, and the second compartment 22. Then, a portion of the air entering the first compartment 21 enters the American valve via the recesses 2331 of the needle 233 to achieve the inflation purpose, and the remaining portion of the air exerts a force on an outer side of the elastic nozzle 28 and thus urge the nozzle 28 to securely clamp the American valve. It is appreciated that the recessed section 283 assists in the clamping. It is further appreciated that the pumping device with the needle 233 may be used on the French valve to achieve the inflation purpose. Nevertheless, the pumping device of FIG. 2 cannot be used on the American valve.

Figure 5:
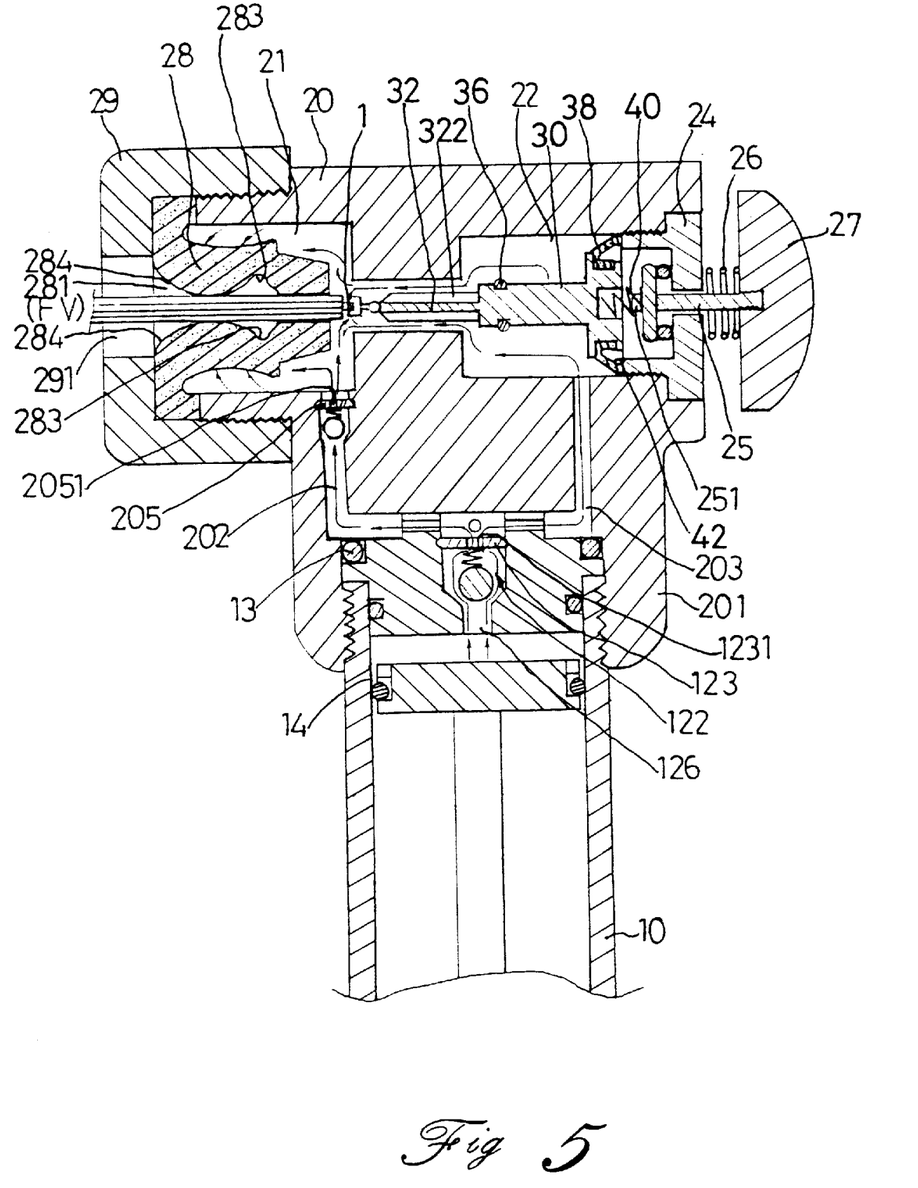
FIG. 5 is a cross sectional view illustrating operation of a modified embodiment of the pumping device on a French valve.

Referring now to FIG. 5, the pumping device of the present invention may further include a further passage 202 which intercommunicates the first compartment 21 and the check valve, and a further check valve 205 is mounted in the passage 202 such that air is flowable from the tubular member 10 to the first compartment 21. The pumping device further includes a pressing means 30 mounted in the second compartment 22. The pressing means 30 includes a needle 32 extending from a first end thereof toward the first compartment 21. The needle 32 is identical to the needle 233 in FIG. 4A and includes a plurality of recesses 322 identical to the recesses 2331 in FIG. 4A. An O-ring 38 is mounted to a second end of the pressing means 30 and includes an annular recess 42 defined therein and facing the enlarged head of the stem 25. A spring 40 is mounted between the second end of the pressing means 30 and the enlarged head (see a stub 251 on the enlarged head) of the stem to bias the pressing means 30 toward the first compartment 21.

When used on a French valve, as shown in FIG. 5, a portion of the air in the tubular member is pumped to the first compartment 21 via the passage 202 to exert a force on the outer side of the nozzle 28 so as to securely clamp the French valve, while the remaining portion of the air in the tubular member 10 is pumped into the French valve via the passage 203 and the first compartment 22. It is appreciated that the French valve is sufficiently long to engage with the needle 32 and push the clamping device 30 to the right (see FIG. 5).

Figure 6:
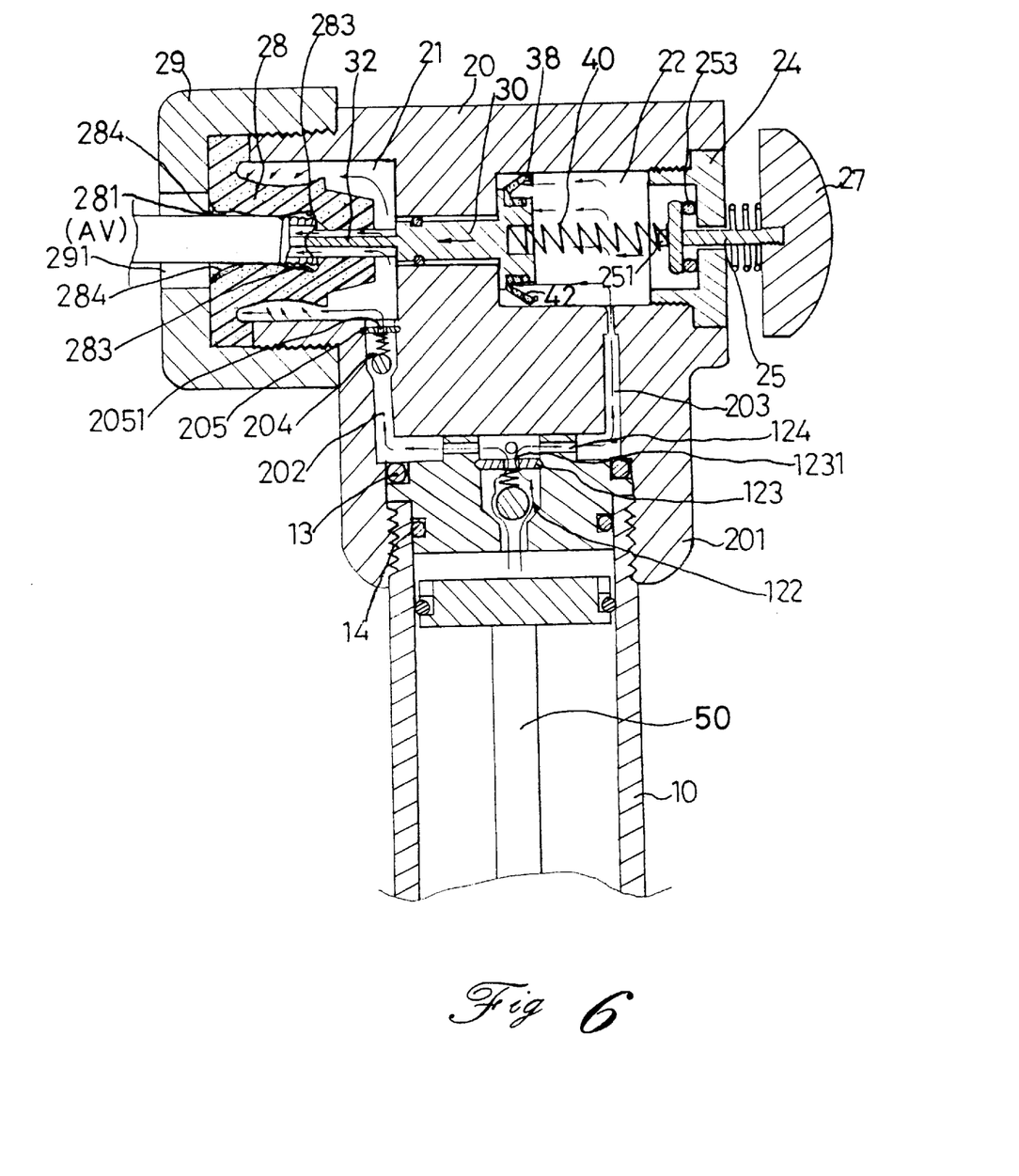
FIG. 6 is a cross sectional view illustrating operation of the modified embodiment of the pumping device on an American valve.

When used on an American valve, as shown in FIG. 6, since the American valve is shorter than the French valve, the spring 40 biases the needle 32 to the left to engage with the American valve. A portion of the air in the tubular member 10 is pumped to the first compartment 21 via the passage 202 to exert a force on the outer side of the nozzle 28 so as to securely clamp the American valve, while the remaining portion of the air in the tubular member 10 enters the second compartment 22 via the passage 203 so as to move the pressing means 30 to the left, thereby securely engaging the needle 32 with the American valve. It is appreciated that a portion of the air entering the first compartment 21 enters the American valve via the recesses 322 of the needle 32, thereby achieving the inflation purpose. Again, it is further appreciated that environmental air enters the chamber defined by the tubular member 10 and the piston head of the piston 30 via the gap defined between the tubular member 10 and the piston head, as mentioned above.

It is appreciated that the recessed clamping section 283 of the nozzle 28 may assist in clamping of either American valve or French valve. The nozzle 28 may be replaced with a new one after a certain period of time.

According to the above description, it is appreciated that the pumping device of the present invention may automatically clamp the valve during pumping. In addition, with provision of the pressing means 30, the pumping device of the invention may be used on different valves without any manual operation.

Although the invention has been explained in relation to its preferred embodiment, it is to be understood that many other possible modifications and variations can be made without departing from the spirit and scope of the invention as hereinafter claimed.

What is claimed is:

1. A pumping device for a valve of a bicycle tire, comprising:

a tubular member having a first end and a second end, pol a piston reciprocatingly received in the tubular member, the piston together with the tubular member defining a chamber, a head, securely, and sealingly mounted to the first end of the tubular member, the head including a compartment in fluid communication with the chamber of the tubular member, an elastic nozzle securely mounted in the compartment, the elastic nozzle including a through-hole adapted to receive the valve of the bicycle tire, the elastic nozzle further including an inner periphery and an outer periphery, the inner periphery of the elastic nozzle including a recessed clamping section, the outer periphery of the elastic nozzle and a wall that defines the compartment having a clearance therebetween, the valve protrudes into the through-hole and past the recessed clamping section of the inner periphery end of the elastic nozzle, a passage means communicated between the chamber and the compartment for supplying air into the compartment during reciprocating motion of the piston, and a pressure release valve mounted to the compartment for releasing pressure in the compartment for removal of the valve after inflation is accomplished wherein when inflating the bicycle tire, air is supplied into the compartment via the passage means upon reciprocating motion of the piston, a portion of the air entering the compartment exerts a radially inward force on the outer periphery of the elastic nozzle to securely clamp the valve during inflation, and the remaining portion of the air entering the compartment is pumped into the bicycle tire via the valve.

2. The pumping device according to claim 1, further comprising a needle mounted in the head, the needle including an end extending into the through hole of the elastic nozzle for engaging with the valve of the bicycle tire.

3. A pumping device for a valve of a bicycle tire, comprising:

a tubular member having a first end and a second end, a piston reciprocatingly received in the tubular member, the piston together with the tubular member defining a chamber, a head, securely, and sealingly mounted to the first end of the tubular member, the head including a first end and a second end, the first end of the head having a first compartment, the second end of the head having a second compartment, the second compartment intercommunicating the first compartment with the chamber of the tubular member, a check valve being mounted in the tubular member such that air is only flowable from the chamber of the tubular member to the second compartment, an elastic nozzle securely mounted in the first compartment, the elastic nozzle including a through-hole adapted to receive the valve of the bicycle tire, the elastic nozzle further including an inner periphery and an outer periphery, the inner periphery of the elastic nozzle including a recessed clamping section, the outer periphery of the elastic nozzle and a wall that defines the first compartment having a clearance therebetween, the valve protrudes into the through-hole and past the recessed clamping section of the inner periphery end of the elastic nozzle, a cap mounted to the first end of the head to securely position the elastic nozzle in the first compartment, the cap including a hole through which the valve of the bicycle tire is extended into the through-hole of the elastic nozzle for inflation, and a pressure release valve mounted to the second compartment for releasing pressure in the first compartment and the second compartment for removal of the valve after inflation is accomplished, wherein when inflating the bicycle tire, air is supplied into the first compartment upon reciprocating motion of the piston, a portion of the air entering the first compartment exerts a radially inward force on the outer periphery of the elastic nozzle to securely clamp the valve during inflation, and the remaining portion of the air entering the compartment is pumped into the bicycle tire via the valve.

4. A pumping device for a valve of a bicycle tire, comprising:

a tubular member having a first end and a second end, a piston reciprocatingly received in the tubular member, the piston together with the tubular member defining a chamber, a head, securely, and sealingly mounted to the first end of the tubular member, the head including a first end and a second end, the head further including a first passage communicated with the chamber and a second passage communicated with the chamber, the first end of the head having a first compartment, the second end of the head having a second compartment that is communicated with the first compartment, the second compartment being communicated with the chamber of the tubular member via the second passage, the first compartment being communicated with the chamber of the tubular member via the first passage, a first check valve being mounted in the tubular member such that air is flowable only from the chamber of the tubular member to the first passage and the second passage, and a second check valve being mounted in the first passage such that air is only flowable from the first passage to the first compartment, an elastic nozzle securely mounted in the first compartment, the elastic nozzle including a through-hole adapted to receive the valve of the bicycle tire, the elastic nozzle further including an inner periphery and an outer periphery, the inner periphery of the elastic nozzle including a recessed clamping section, the outer periphery of the elastic nozzle and a wall that defines the first compartment having a clearance therebetween, a cap mounted to the first end of the head to securely position the elastic nozzle in the first compartment, the cap including a hole through which the valve of the bicycle tire is extended into the through-hole of the elastic nozzle for inflation, a pressing means mounted in the second compartment, the pressing means including a needle extending toward the elastic nozzle for engaging with the valve of the bicycle tire, an elastic member mounted in the second compartment for biasing the needle of the pressing means toward the elastic nozzle, and a pressure release valve mounted to the compartment for releasing pressure in the compartment for removal of the valve after inflation is accomplished, wherein when inflating the bicycle tire upon reciprocating motion of the piston, a portion of the air in the chamber enters the first compartment via the first passage and exerts a radially inward force on the outer periphery of the elastic nozzle to securely clamp the valve during inflation, and the remaining portion of the air is pumped into the bicycle tire via the second passage and the valve.

* * * * *